(12) United States Patent
Baker et al.

(10) Patent No.: US 7,973,799 B2
(45) Date of Patent: Jul. 5, 2011

(54) SHADING USING TEXTURE SPACE LIGHTING AND NON-LINEARLY OPTIMIZED MIP-MAPS

(75) Inventors: Daniel K. Baker, Bellevue, WA (US); Michael V. Oneppo, Kirkland, WA (US); Samuel Glassenberg, Kirkland, WA (US); Peter-Pike J. Sloan, Bellevue, WA (US); John Rapp, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/829,896

(22) Filed: Jul. 2, 2010

(65) Prior Publication Data

US 2010/0271383 A1 Oct. 28, 2010

Related U.S. Application Data

(62) Division of application No. 11/373,755, filed on Mar. 9, 2006, now Pat. No. 7,768,523.

(51) Int. Cl.
*G09G 5/00* (2006.01)

(52) U.S. Cl. ........ 345/587; 345/426; 345/582; 345/584; 345/644

(58) Field of Classification Search .......... None
See application file for complete search history.

(56) References Cited

U.S. PATENT DOCUMENTS 7,768,523 B2  8/2010  Baker et al.

OTHER PUBLICATIONS

Schilling, A., "Towards Real-Time Photorealistic Rendering: Challenges and Solutions," Proc. of Eurographics Workshop on Graphics Hardware, 1997, p. 7-15.*

"3Dc Normal Compression", ATI Developer: Source Code, www.ati.com-developer-samples-dx9-3dcnormalcpmpression.html, accessed (no month available) 2005, 2 pages.

Ashikhmin et al., "An Anisotropic Phong BRDF Model", Journal of Graphic Tools, Dec. 2000, 5(2), 25-32.

Becker et al., "Smooth Transitions between Bump Rendering Algorithms", Proceedings of the 20th annual conference on Computer graphics and interactive techniques, Anaheim, CA, (no month available) 1993, 183-190.

Blinn, "Models of Light Reflection for Computer Synthesized Pictures", In SIGGRAPH '77, Proceedings of the 4th annual conference on Computer graphics and interactive techniques, (no month available) 1977, 11(2), 192-198.

Blinn, "Simulation of Wrinkled Surfaces", SIGGRAPH-ACM, Aug. 1978, 12(3), 286-292.

Cabral et al., "Bidirectional Reflection Functions from Surface Bump Maps", Proceedings of the 14th annual conference on Computer graphics and interactive techniques, Jul. 1987, 21(4), 273-281.

(Continued)

*Primary Examiner* — Antonio A Caschera
(74) *Attorney, Agent, or Firm* — Woodcock Washburn LLP

(57) ABSTRACT

In a technique for rendering non-linear BRDFs that are stable in both the temporal and spatial domains, without serious interruption to the content creation pipeline used in most games, non-linear content is linearized by rendering in texture space at a fixed resolution. A MIP-map chain is calculated from this texture. The complete MIP-map chain is used for rendering on a display device. Low resolution reflectance parameters are used to approximate the highest resolution reflectance parameters as the object becomes smaller on the display device. The low resolution reflectance parameters are calculated using non linear fitting techniques.

9 Claims, 7 Drawing Sheets

OTHER PUBLICATIONS

Fournier, "Filtering Normal Maps and Creating Multiple Surfaces", Technical Report, TR-92-41, (no month available) 1992, 1-14.

Heidrich, "High-Quality Shading and Lighting for Hardware-Accelerated Rendering", Phd Thesis, University of Erlangen, Computer Graphics Group, (no month available) 1999, 1-148.

Meinds et al., "Resample hardware for 3D graphics", Proceedings of the ACM SIGGRAPH/Eurographics conference on Graphics hardware, Saarbrucken, Germany, (no month available) 2002, 17-26.

Olano et al., "Normal Distribution Mapping", Technical Report, University of North Carolina, (no month available) 1996, 1-7.

Tan et al., "Multiresolution Reflectance Filtering", Eurographics Symposium on Rendering, Jul. 2005, 6 pages.

Williams, "Pyramidal Parametrics", ACM SIGGRAPH Computer Graphics, Jul. 1983, 17(3), 1-11.

Wloka, "GPU-Assisted Rendering Techniques", Presentation-Game Developers Conference, (no month available) 2004, 40 pages.

* cited by examiner

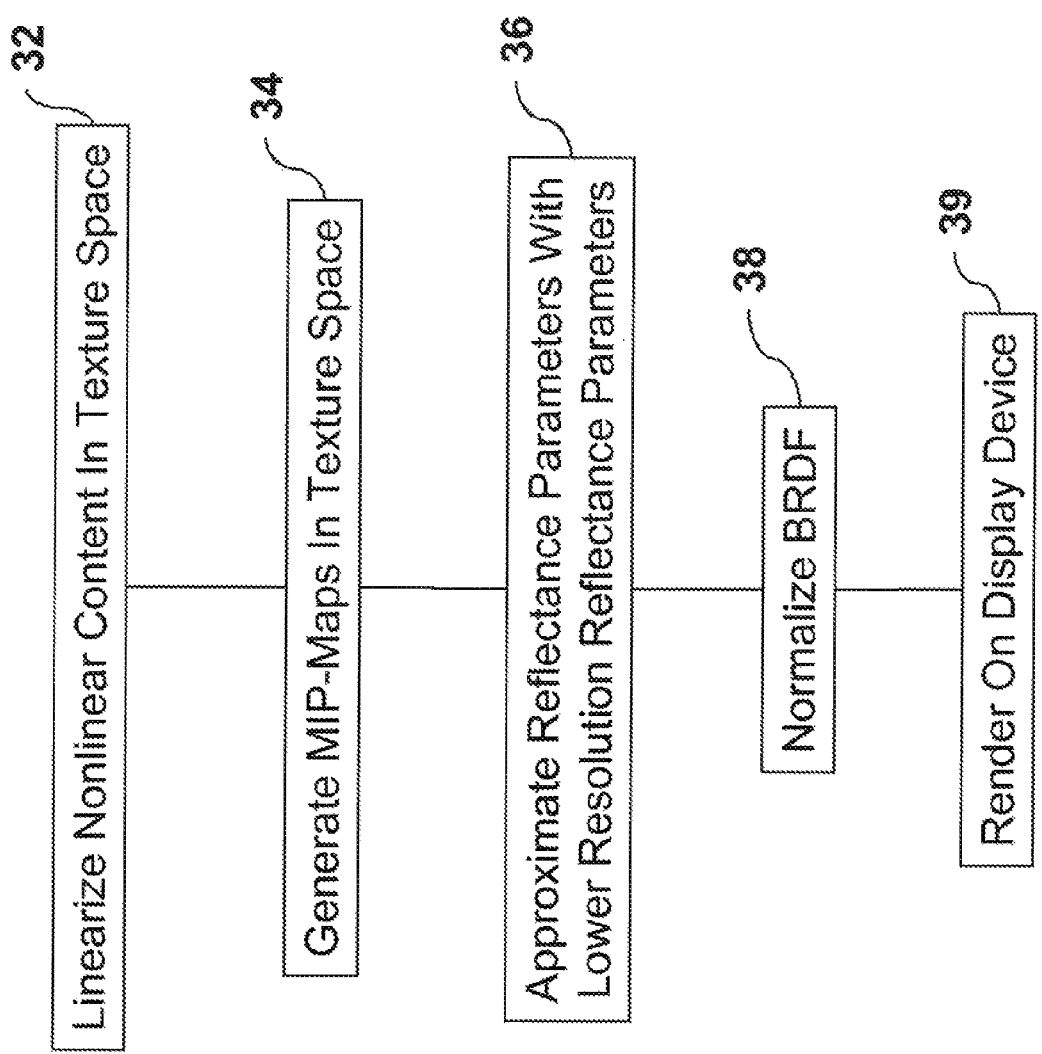

SHADING USING TEXTURE SPACE LIGHTING AND NON-LINEARLY OPTIMIZED MIP-MAPS

CROSS-REFERENCE TO RELATED APPLICATIONS

This application is a divisional application of U.S. patent application Ser. No. 11/373,755, filed Mar. 9, 2006, which is incorporated herein by reference in its entirety.

TECHNICAL FIELD

The technical field relates generally to computer graphics and more specifically to rendering non-linearly enhanced computer graphics.

BACKGROUND

Current computer graphics techniques include sophisticated software and hardware to quickly compute and provide realist three dimensional (3D) renderings. Current 3D hardware comprises special purpose texture filtering abilities that are typically optimized for linear data. When these filters are applied to non-linear texture data, such as normals and specular exponents used in lighting equations, the artifacts generated can be severe. Texture space lighting has been utilized to mitigate these artifacts. Texture space lighting includes non-linear lighting equations for computing lighting of a geometry per-sample on a texture rather than per-pixel. Texture space lighting can eliminate artifacts caused by linearly filtering non-linear data by applying non-linear lighting equations directly to data that can be linearly filtered.

Texture space lighting, however, is bottlenecked by the fact that regardless of the size of the object on the screen, the lighting of the object is computed for every sample of the full-resolution texture. Existing solutions attempt to minimize this bottleneck by computing the lighting for the samples only on the needed levels of the MIP-map chain. A MIP-map chain is a series of textures used to render an object at different scales (e.g., viewing the object from different distances). A MIP-map chain comprises a series of textures, each having a different resolution and each pre-filtered to represent the same texture data at multiple scales. Unfortunately, computing lighting for only the needed levels of the MIP-map chain negates the benefit of texture space lighting, because MIP-maps are calculated using linear filtering techniques.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

To mitigate aliasing and accuracy problems associated with real-time normal mapping, a technique and system are provided for rendering non-linear Bidirectional Reflectance Distribution Functions (BRDFs) that are stable in both the temporal and spatial domains. The technique can be implemented with minimal perturbation to the content creation pipeline used in many graphics generation applications (e.g., games, animation, or the like). In an example embodiment, non-linear content is linearized by rendering the content in texture space at a fixed resolution. A MIP-map chain is generated from this texture. The complete MIP-map chain is used for display rendering (rendering on a display device). Low resolution reflectance parameters are used to approximate the highest resolution reflectance parameters as the object becomes smaller on the display device. The low resolution reflectance parameters are calculated using non linear fitting techniques.

BRIEF DESCRIPTION OF THE DRAWINGS

The foregoing summary, as well as the following detailed description, is better understood when read in conjunction with the appended drawings. For the purpose of illustrating shading using texture space lighting and non-linearly optimized MIP-maps, there is shown in the drawings exemplary constructions thereof; however, shading using texture space lighting and non-linearly optimized MIP-maps is not limited to the specific methods and instrumentalities disclosed.

FIG. 5 is a flow diagram for an example process for shading using texture space lighting and non-linearly optimized MIP-maps.

DETAILED DESCRIPTION OF ILLUSTRATIVE EMBODIMENTS

In computer graphics, normal mapping, a variant of bump mapping, is a real-time technique for providing per-pixel detail on rendered objects, via embedding normal and other reflectance information in a texture. For real-time applications, normal mapping is typically employed without regard to filtering and aliasing issues. Although three dimensional (3D) hardware has special purpose texture filtering hardware which works well for linear or near linear content, this hardware does not work for non-linear content such as simple Blinn-Phong shading, for example. The use of hardware filters causes both temporal aliasing and inaccurate shading.

In non-real time, offline, rendering, such problems can be mitigated through a combination of increased sampling and aliasing aware shaders. In real-time rendering, however, the performance is not available to mitigate aliasing inside a shader program. Therefore, such sampling and aliasing issues are usually dealt with in an ad hoc way, such as training artists not to use high-frequency content for example.

Figure 1B:
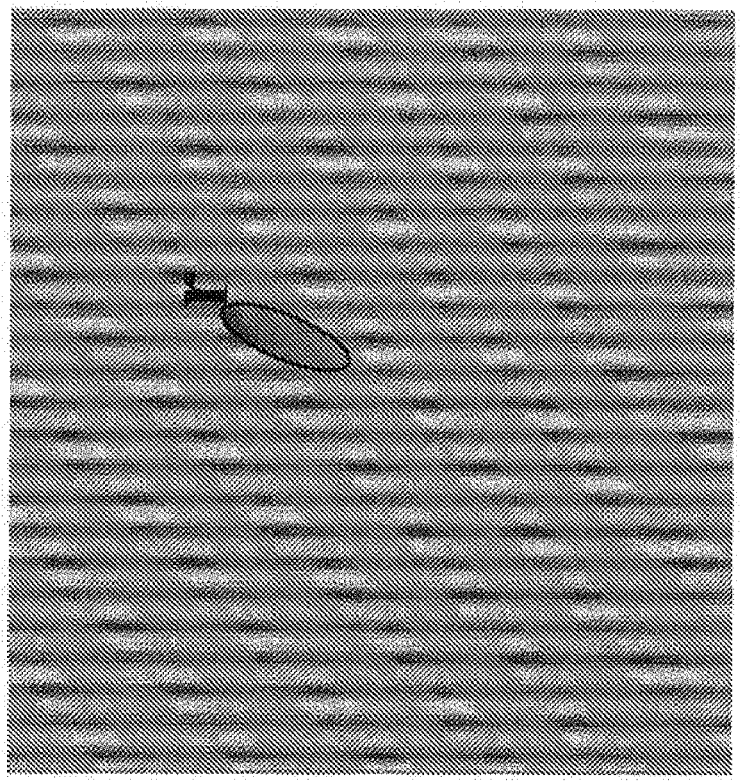
FIG. 1 is an illustration of an example mesh having a normal map texture applied to it.
Figure 1A:
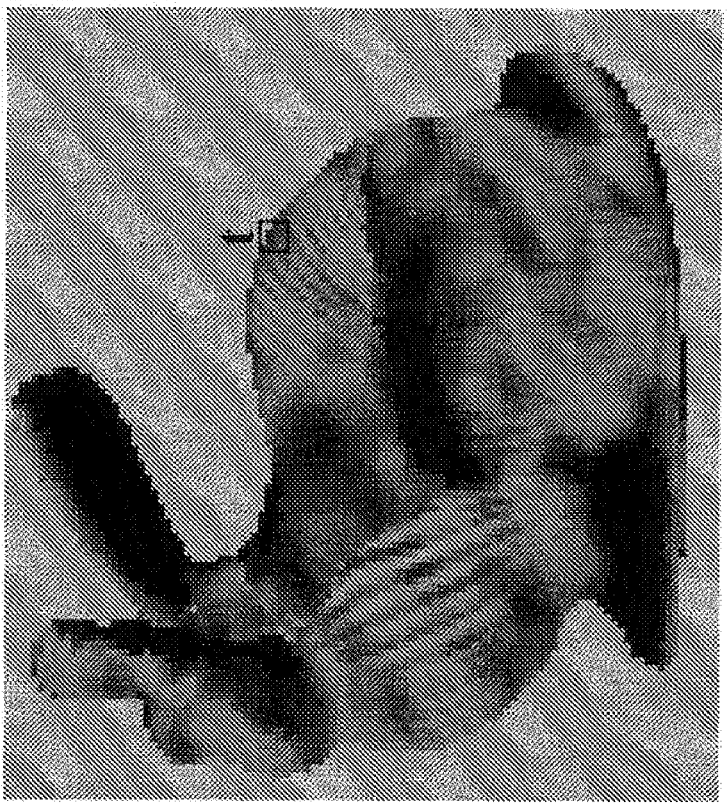

FIG. 1 is an illustration of an example mesh having a normal map texture applied to it. When combining the normal map texture with the mesh's local tangent frame, the normal map essentially provides a parameterized lighting function at each point on the mesh. The model (rabbit) depicted in FIG. 1A was lit with a Blinn-Phong Bidirectional Reflectance Distribution Function (BRDF), using a normal texture representing vertical stripes. The Blinn-Phong BRDF is a nonlinear function. Point "t" in FIG. 1A corresponds to a region "r" in the texture domain depicted in FIG. 1B. Point "t" represents the evaluation of a domain of texels (texture elements), "r."

The value of the BRDF at point "t" is the integral over the region "r" in FIG. 1B. Mathematically, the value of the pixel "t" can be represented by equation (1) below.

$$\sum_r w_r b(N_r H) \qquad (1)$$

where "r" is the domain on the texture, $w_r$ is a weight associated with each texel sample (usually calculated by hardware), b is the BRDF, $N_r$ represents the BRDF parameters, and H is the half-way vector. H is a defined graphics term representing the normalized vector that is half way between the view vector and the light vector, and results from the sum of the view vector and the light vector.

In many scenarios, such as in games for example, equation (1) is approximated by equation (2) below.

$$b\Sigma(w_r, N_r, H) \qquad (2)$$

When b is a linear function, or near linear (e.g. diffuse lighting), equation (1) and equation (2) can produce similar results. When b is non-linear function, however, the differences in the results between equation (1) and equation (2) can be more significant. Example differences include temporal instability and incorrect illumination.

Figure 2B:
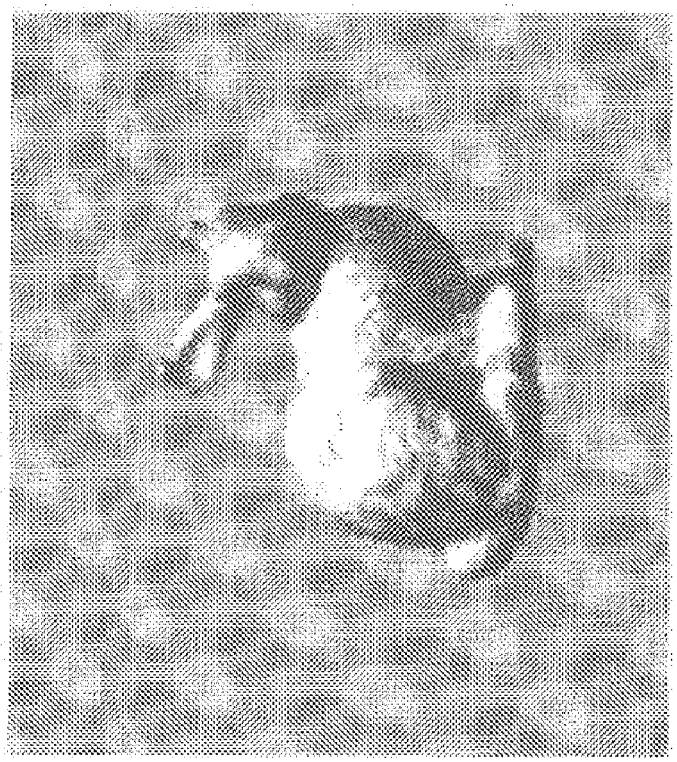
FIG. 2 is illustrates unstable results due to sampling.
Figure 2A:
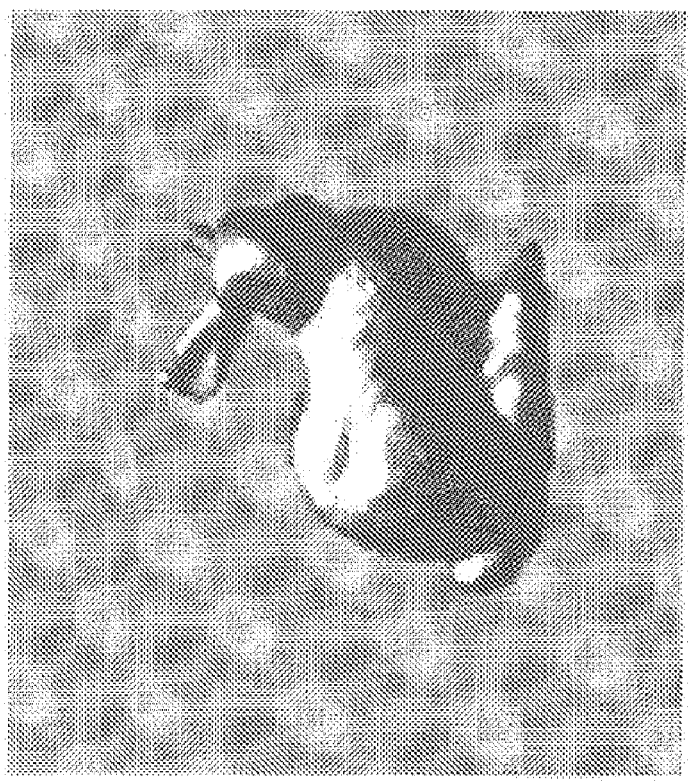

FIG. 2 illustrates unstable results due to sampling. FIG. 2A depicts unstable results due to linear filtering of nonlinear BRDF, (such as Blinn-Phong, for example) data. FIG. 2B depicts the object without unstable results. Temporal instability is sometimes referred to as shimmering. Shimmering is evident when minor, sometimes imperceptible, movements in camera or an object's position cause pixels to rapidly change intensity in a manner which looks much like white noise. Shimmering can occur when a normal aligns to the half way angle on an intermediate sample point, causing a point to turn on or off based on the sub-texel position. This, in part, is due to aliasing. But much is due to linear filtering non-linear data.

Another instability, or artifact, is incorrect illumination. Incorrect illumination refers to the shape and size of the highlight being vastly different. This is depicted in the differences between FIG. 2A and FIG. 2B. In this case, the differences arise because the specular power for rough objects should decrease as the scale becomes coarser, something which a linear filter fails to capture.

The systems and techniques described herein for providing shading using texture space lighting and non-linearly optimized MIP-maps can be implemented without perturbing the creation pipeline associated with hardware 3D graphics systems. The quality of rendering can be improved with minimal impact on production pipelines including shader creation and data storage. The techniques do not require shader authors and/or content creators to posses an understanding of the filtering strategy.

Aliasing, filtering, and accuracy issues associated with rendering graphics are mitigated by combining texture space lighting with approximate reflectance models at the appropriate MIP-map level. A nearly unmodified shader is used to render into the texture domain. Then low resolution fixed renders are substituted for high resolution representations so that objects far from the viewer require less processing. To create lower representation normal maps, a BRDF model is fitted to itself at different scales. In an example embodiment, a normalized Blinn-Phong shading model is used in place of a normal map BRDF representation.

Figure 3:
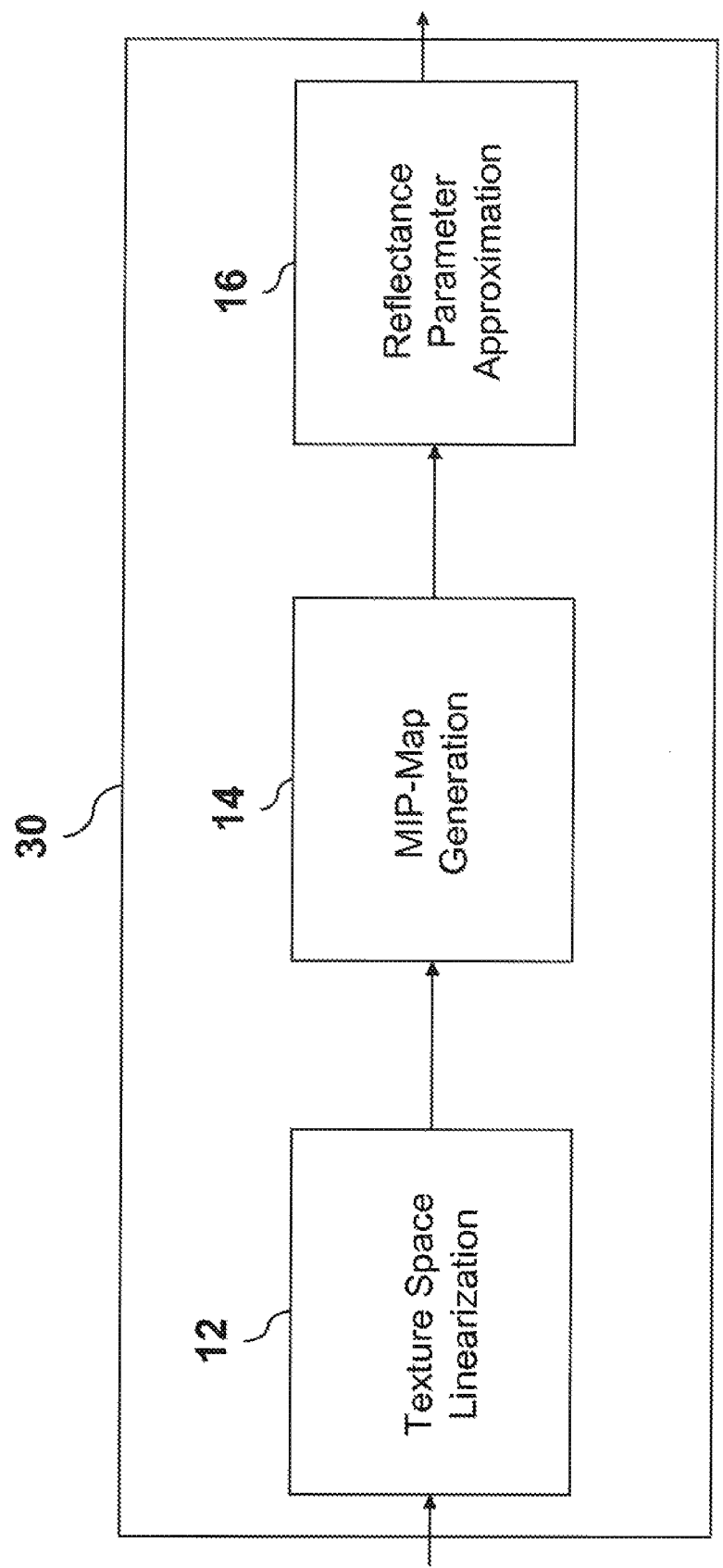
FIG. 3 is an example functional block diagram of a system for providing shading using texture space lighting and non-linearly optimized MIP-maps.

FIG. 3 is an example functional block diagram of a system 30 for providing shading using texture space lighting and non-linearly optimized MIP-maps. At block 12, non-linear content is linearized by rendering the content in texture space at a fixed resolution. At block 14, a MIP-map chain is generated utilizing this texture. It is this MIP-map chain that is used for rendering on a display device. Low resolution reflectance parameters are calculated using non linear fitting techniques in block 16.

To accomplish texture space linearization (12), rather then calculate the lighting of an object directly in screen space of a display device, the lighting of an object to be rendered on a display device is captured into a texture by rasterizing the object's triangles using its texture coordinates as two dimensional (2D) positions. This rasterization is accomplished at the highest MIP-map resolution level to be rendered on the display device. If this rendering is performed using only point sampling, then it can be assured that no BRDF aliasing due to filtering will result, because filtering has been disabled.

The texture space linearization process (12) creates discrete sample points for the texture space lighting domain. The texture now contains a collection of lit sample points corresponding to locations on the object's surface. The values rendered into the texture represent the output of the BRDF.

Figure 4A:
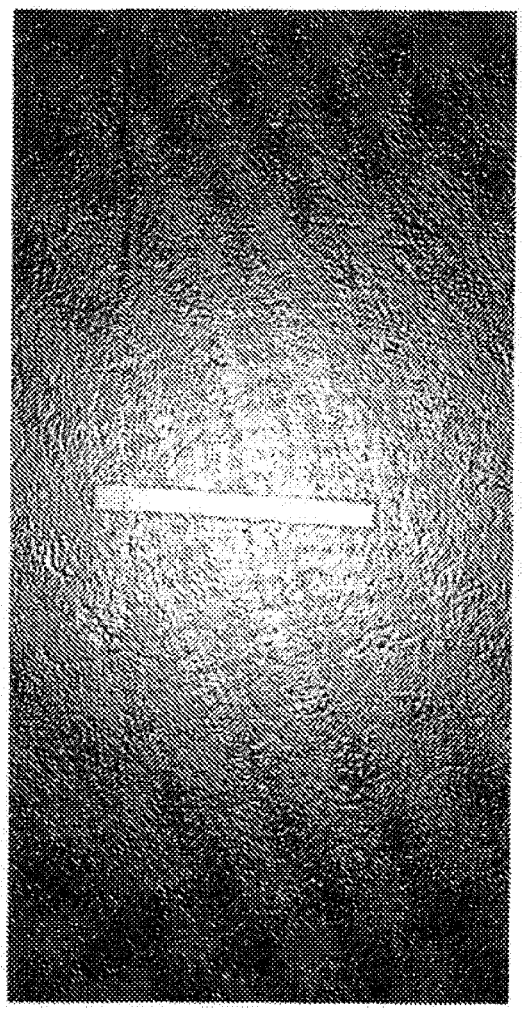
FIG. 4 depicts artifacts caused by using linear filters on normal map data.
Figure 4B:
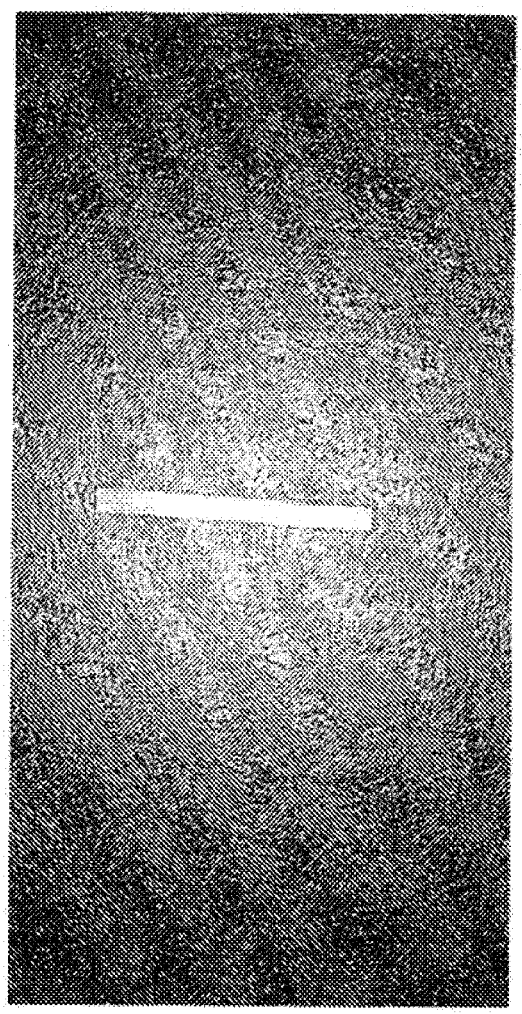

Because the output of a BRDF is the amount of energy reflected in absolute terms, these values are linear by definition. Thus, linear techniques can be utilized to process the texture without detrimental effects. In an example embodiment, MIP-map hardware is used to generate the MIP-map chain (14) in real time for linear textures. FIG. 4 depicts artifacts caused by using linear filters on normal map data. FIG. 4A illustrates artifacts caused by using 3D hardware linear filters to nonlinear normal map data. The image in FIG. 4A was rendered utilizing straightforward rasterization. Hatching patterns and highlighting artifacts can be seen in FIG. 4A as compared to FIG. 4B. FIG. 4B was rendered utilizing texture space lighting as described above.

Implementation of texture space lighting does not perturb hardware filtering techniques. The performance of texture space lighting when used with hardware filtering techniques suffers, however, from an algorithmic performance bottleneck relating to fixing the resolution at which the BRDF is evaluated. By locking the resolution of evaluation of the BRDF, all objects rendered on the display device require a high amount of processing, even if the objects are relatively small or contribute relatively little to the rendering. It has been observed that for objects with a small amount of screen coverage, higher resolution level MIP-map levels may never be accessed. Accordingly, in an example embodiment in accordance with block 14 of FIG. 3, the maximum MIP-map resolution level to be rendered on the display device is utilized, rather then rendering into the maximum achievable MIP-map level. In this embodiment, each level of the MIP-map chain best represents the original normal map.

In an example embodiment, the maximum MIP-map level to be rendered (14) on the display device is determined by finding the edge of the triangle with the least movement across the texture map. This edge is projected to the closest possible configuration at which it could appear, the distance traversed reveals the maximum MIP-map level which will be rendered on the display device. Thus, rather then rendering at the highest possible MIP-map level, the lowest MIP-map level that will be read by the filtering hardware is rendered into.

At distant MIP-map levels, for many textures the resulting material becomes nearly homogenous, and no longer aliases in an appreciable manner. Going beyond the distant MIP-map level no longer resulted in a significant quality difference with texture space lighting. Thus, in an example embodiment, texture space lighting is disabled beyond this distant MIP-map level. To accomplish this, aliasing information for a given texture is accumulated and utilized to determine at which MIP-map level texture space lighting can be disabled.

Reflectance parameters are approximated in accordance with block 16. MIP-maps are generated to achieve a lower resolution image that best approximates a higher resolution image. To determine the appropriate reflectance parameters to use with the lower resolution MIP-map chain, the error between the lower resolution MIP-map and the higher resolution MIP-map is determined. Reflectance parameters for an appropriate texture space lighting model can be used, such as the Blinn-Phong light model, for example. The error is determined by an error function. This error is minimized to determine the appropriate reflectance parameters. Calculation of the error function facilitates a determination of the accuracy of a MIP-map generation technique. In an example embodiment, the error function is an integral that integrates over the square error along all possible views and light directions (V and L, respectively), with even distributions on the hemisphere. The error function is determined in accordance with equation (3) below.

$$e(N, k, p) = \int_L \int_V \left( \frac{1}{wh} \sum_{i=0}^{w} \sum_{j=0}^{h} f_{ij}(L, V) - f(L, V) \right)^2, \quad (3)$$

In equation (3), e represents the error function, and its arguments N, k, and p, represent the Normal, k, and Power parameters of the specular component of the BRDF (e.g., Blinn-Phong BRDF), respectively, and w and h refer to the region of the highest resolution MIP level corresponding to a given texel. The function f represents the BRDF (e.g., the Blinn-Phong BRDF), N represents the normal vector, k corresponds to the Ks term of the model (e.g., Blinn-Phong model), p represents the power of the light model (e.g., Blinn-Phong light model), w represents the width of the region of pixels of the lowest MIP chain, h represent the height of the region of pixels of the lowest MIP chain, L represents the light vector, and V represents the view vector. In an example embodiment, the error function, e, is determined for higher resolution MIP-map levels toward lower resolution MIP-map levels, so as to mitigate error propagation. The error function, e, is observed to be primarily smooth, i.e., a two dimensional plot of this error function does not have discontinuous properties. Determining the error as described above, allows the use of non-linear optimization techniques to find a best solution. In an example embodiment, the BFGS non-linear optimizing algorithm is used. BFGS does not require the error term to approach 0.

In another example embodiment, another error function that integrates over all possible half angles is utilized. It was observed that utilizing a BFGS non-linear solver ran relatively slowly in a production pipeline. Most of the time was spent in the evaluation of the error function and its derivatives. Since the Blinn-Phong BRDF is half angle based, it was determined that rather use a general minimization which is applicable to all BRDFs, an error function was constructed that integrates over all possible half angles, thereby reducing the dimensionality from 4 to 2, and significantly reducing processing time. This error function is determined in accordance with equation (4) below.

$$e(N, k, p) = \int_H \left( \sum_{i=0}^{w} \sum_{j=0}^{h} f_{ij}(H) - f(H) \right)^2, \quad (4)$$

where e represents the error function, and its arguments N, k, and p, represent the Normal, k, and Power parameters of the specular component of the BRDF (e.g., Blinn-Phong BRDF), respectively, and w and h refer to the region of the highest resolution MIP level corresponding to a given texel. The function f represents the BRDF (e.g., the Blinn-Phong BRDF), N represents the normal vector, k corresponds to the Ks term of the Blinn-Phong model, p represents the power of the light model (e.g., Blinn-Phong light model), w represents the width of the region of pixels of the lowest MIP chain, h represent the height of the region of pixels of the lowest MIP chain, L represents the light vector, V represents the view vector, and H is the half-way vector indicative of the sum of the view vector, V, and the light vector, L.

In another example embodiment, a normalized BRDF is utilized. Any appropriate normalized BRDF can be utilized, such as a normalized Blinn-Phong BRDF, for example. Using a non-normalized BRDF, it has been observed that each successive MIP level entails a precise and steadily decreasing $K_s$ term. Using a normalized BRDF (e.g., a normalized Blinn-Phong lighting model) however, the BRDF was easier to manipulate and it was observed that $K_s$ remained nearly linear. Thus, in an example embodiment, the $K_s$ term is not fitted, and for a constant value of $K_s$ across a texture, $K_s$ is not stored in the normal map. The normalized BRDF is determined in accordance with equation (5) below.

$$l = k_d(N \cdot L) + k_s p(N \cdot H)^p, \quad (5)$$

where l represents the normalized BRDF, $k_d$ and $k_s$ correspond to respective terms of the BRDF, N represents the normal vector, L represents the light vector, p represents the power of the BRDF (e.g., Blinn-Phong light model), and H represents the half-way vector indicative of the sum of the view vector, V, and the light vector, L. H is a distribution of half angles in the hemisphere, which is no longer uniform on the hemisphere. In this example embodiment, the standard Blinn-Phong lighting equation is used, with a modification: Ks by p. By doing this, the global energy of the function (integrated against the hemisphere), does not alter significantly when p is changed. That is, the total amount of energy is preserved.

The BFGS non-linear optimization for large textures (e.g., 1024×1024 pixels) can still take several hours to process, due to the high performance cost of the error evaluation function. This cost can be mitigated if an appropriate initial guess of the BRDF parameters is used. BRDF parameters at a scale are a result of the distribution of normals. Thus, based on previous sample points, a table is generated, which can be used by similar, subsequent sample points as an initial guess. The eigenvalues of the covariance matrix (6), below, are determined utilizing the variance of the x and y components of the normal, rather then the derivative of a height map.

$$\frac{1}{k} \begin{bmatrix} \sum_{i=0}^{k} (N_x - \overline{N_x})^2 & \sum_{i=0}^{k} (N_x - \overline{N_x})(N_y - \overline{N_y}) \\ \sum_{i=0}^{k} (N_y - \overline{N_y})(N_x - \overline{N_x}) & \sum_{i=0}^{k} (N_y - \overline{N_y})^2 \end{bmatrix}, \quad (6)$$

where N is the normal, and $N_x$ and $N_y$ are the x and y components of the normal, and k represents the region of highest level normal map corresponding to the given texel. For a given texture, a three entry table is generated using a precise fit on five percent of the texture. This lookup table comprises an average power, and two eigenvalues of the covariance matrix (6). The nearest entry in the table is used as the initial guess. For example, a standard initial guess is taken on 5% of the texture, and a complete non-linear optimize fit is performed. The resultant samples are used on the remaining 95% of sample points to find the sample with the most similar characteristics and use its final answer as the initial guess.

FIG. 5 is a flow diagram for an example process for shading using texture space lighting and non-linearly optimized MIP-maps. At step 32, nonlinear content is linearized by rendering the content in texture space at a fixed resolution. As described above, the lighting of an object is rendered into a texture by rasterizing the object's triangles using its texture coordinates as 2D positions, at the highest MIP-map level to be rendered on the display device. The texture comprises lit points corresponding to locations on an object's surface and represents the output of the BRDF. The rendering into the texture space is linear, and stable in time and scale.

MIP-maps are generated in texture space at step 34. In an example embodiment, hardware is used to generate the MIP-maps, however, any appropriate generation means can be use, such as a software MIP-map generation means, for example. MIP-maps are generated such that the maximum MIP-map level to be rendered on the display device utilized. Thus, each level of the MIP-map chain represents the original normal map. As described above, the maximum MIP-map level to be rendered on the display device is determined by finding the edge of the triangle with the least movement across the texture map, and projecting that to the closest possible configuration at which it could appear. The distance traversed reveals the maximum MIP-map level which will be rendered on the display device. Reflectance parameters are approximated with lower resolution reflectance parameters at step 36.

Figure 6:
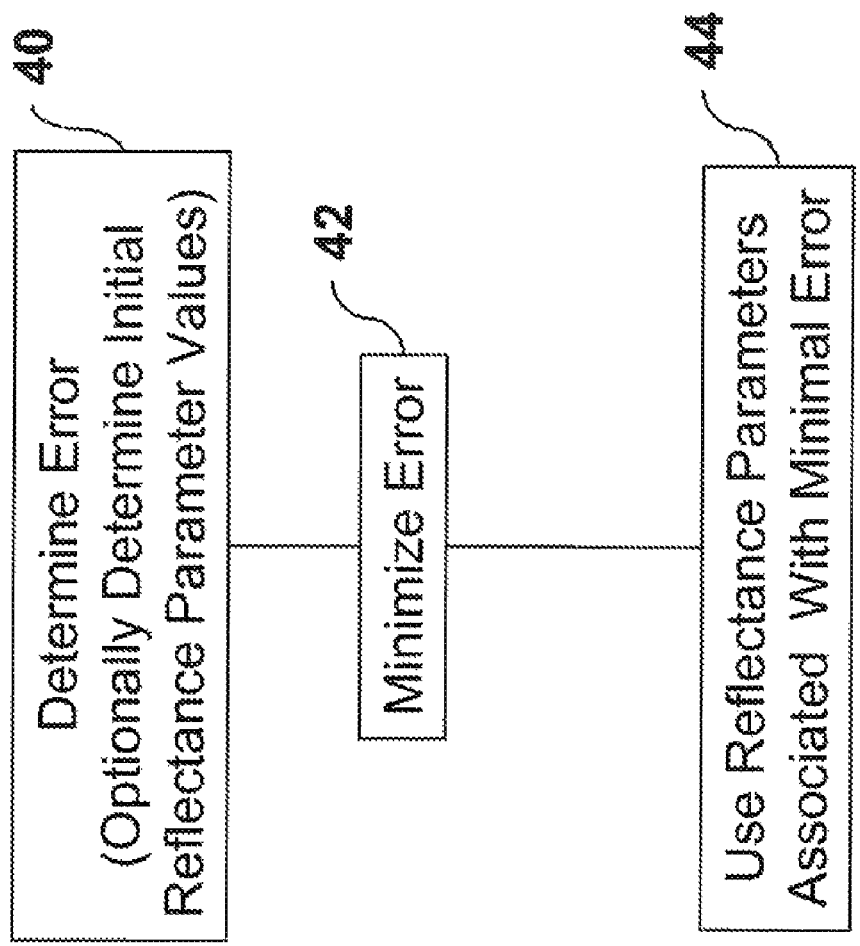
FIG. 6 is a flow diagram of an example process for approximating reflectance parameters.

FIG. 6 is a flow diagram of an example process for approximating reflectance parameters. The error between using the lower resolution MIP-map and the higher resolution MIP-map for a texture space lighting model is determined at step 40. To determine the appropriate reflectance parameters to use with the lower resolution MIP-map chain, an error function is utilized. The error is minimized (step 42) and the reflectance parameters associated with the minimal error are used for rendering on the display device (step 44). In an example embodiment, the Blinn-Phong texture space lighting model is used. Any appropriate error function can be utilized. In one example embodiment, the error function is an integral that integrates over the square error along all possible views and light directions (V and L, respectively), with even distributions on the hemisphere in accordance with equation (3) above. In another example embodiment, an error function that integrates over all possible half angles is utilized in accordance with equation (4) above. The error function is determined for the higher resolution MIP-map level toward the lowest MIP-map level to mitigate error propagation. In an example embodiment, the BFGS error function is used.

Optionally, at step 40, initial reflectance parameter values are determined. Appropriate initial values guess can quicken the error determination process. In an example embodiment, an initial guess of the BRDF parameters is made based on an average power, and two eigenvalues of the covariance matrix (6), above. The nearest entry in the table is used as the initial guess.

Referring again to FIG. 5, optionally, the BRDF is normalized at step 38. Normalizing the BRDF results in a linear at the $K_s$ term of the reflectance parameters of the BRDF. As previously describe, the normalized BRDF can be determined in accordance with equation (5) above. Shading using texture space lighting and non-linearly optimized MIP-maps as described above is rendered on the display device at step 39.

Figure 7:
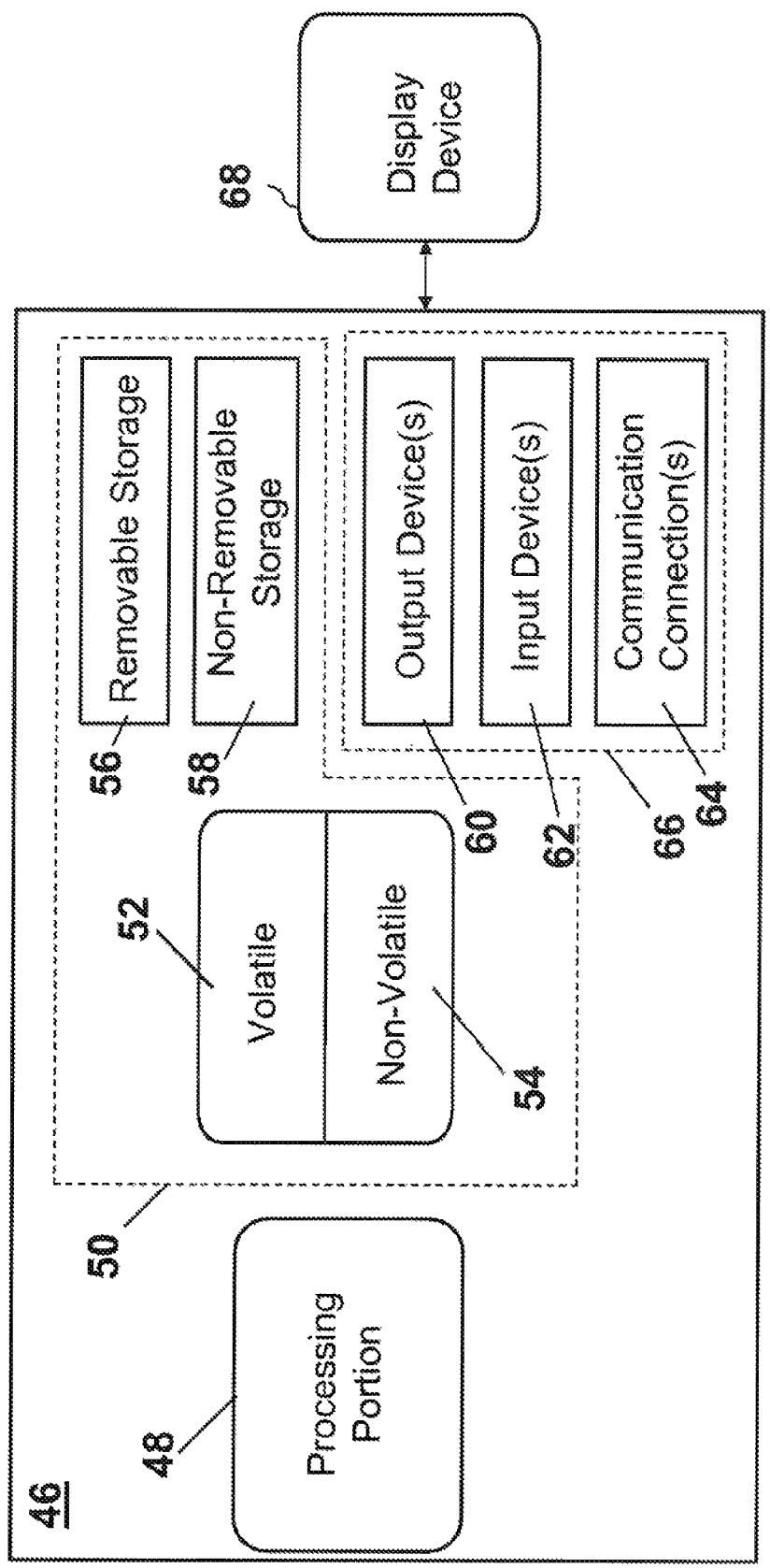
FIG. 7 is a diagram of an example computing device for providing shading using texture space lighting and non-linearly optimized MIP-maps.

FIG. 7 is a diagram of an example computing device 46 for providing shading using texture space lighting and non-linearly optimized MIP-maps. For example, computing device 46 can implement texture space linearization (e.g., texture space linearization 12 of FIG. 1), MIP-map generation (e.g., MIP-map generation 14 of FIG. 1), and reflectance parameter approximation (e.g., reflectance parameter approximation 16 of FIG. 1). Computing device 46 comprises a processing portion 48, a memory portion 50, and an input/output portion 66. The processing portion 48, memory portion 50, and input/output portion 66 are coupled together (coupling not shown in FIG. 7) to allow communications therebetween. The processing portion 48 is capable of rendering shading using texture space lighting and non-linearly optimizing MIP-maps on the display device 68, as described above. The memory portion 50 is capable of storing all parameters described above, parameters associated with equations (1), (2), (3), (4), (5), and (6), and any additional information, for example. Input/output portion 66 is capable of providing and/or receiving the components described above utilized to implement shading using texture space lighting and non-linearly optimized MIP-maps. For example, input/output portion 66 is capable of providing shading using texture space lighting and non-linearly optimizing MIP-maps to the display device 68.

The processing portion 48 is capable of performance all appropriate functions described above for providing shading using texture space lighting and non-linearly optimized MIP-maps. For example, the processing portion 48 is capable of linearizing nonlinear content in texture space, generating MIP-maps in texture space, approximating reflectance parameters with lower resolution reflectance parameters, determining error between a higher resolution MIP-map and a lower resolution MIP-map implementation, determining an initial guess for BRDF parameters, determining the reflectance parameters associated with the minimum error, and rendering on a display device shading using texture space lighting and non-linearly optimized MIP-maps.

Computing device 46 can be implemented as a client processor and/or a server processor. Depending upon the exact configuration and type of processor, memory portion 50 can be volatile (such as RAM) 52, non-volatile (such as ROM, flash memory, etc.) 54, or a combination thereof. Computing device 46 can have additional features/functionality. For example, computing device 46 can include additional storage (removable storage 56 and/or non-removable storage 58) including, but not limited to, magnetic or optical disks, tape, flash, smart cards or a combination thereof. Computer storage media, such as memory portion 50, 52, 54, 56, and 58, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by computing device 46. Any such computer storage media can be part of computing device 46.

Computing device 46 can also contain communications connection(s) 64 that allow the computing device 46 to communicate with other devices. Communications connection(s) 64 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing device 46 also can have input device(s) 62 such as keyboard, mouse, pen, voice input device, touch input device, etc. Output device(s) 60 such as a display, speakers, printer, etc. also can be included.

The various techniques described herein can be implemented in connection with hardware or software or, where appropriate, with a combination of both. Thus, the methods and apparatuses for providing shading using texture space lighting and non-linearly optimized MIP-maps or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for indexing and searching numeric ranges. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. The methods and apparatuses for providing shading using texture space lighting and non-linearly optimized MIP-maps also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing shading using texture space lighting and non-linearly optimized MIP-maps. When implemented on a general-purpose processor, the program code combines with the processor to provide a unique apparatus that operates to invoke the functionality of providing shading using texture space lighting and non-linearly optimized MIP-maps. Additionally, any storage techniques used in connection with providing shading using texture space lighting and non-linearly optimized MIP-maps can invariably be a combination of hardware and software.

Combining texture space lighting with approximate reflectance models at the appropriate MIP-map level provides a performance rendering solution that mitigates, and in many cases minimizes, aliasing and filtering issues. Additionally, because the shaders output content in linear space, the techniques described herein are compatible with existing 3D graphic hardware. While shading using texture space lighting and non-linearly optimized MIP-maps a display item on multiple display devices has been described in connection with the example embodiments of the various figures, it is to be understood that other similar embodiments can be used or modifications and additions can be made to the described embodiments for performing the same functions of shading using texture space lighting and non-linearly optimized MIP-maps without deviating therefrom. For example, BRDFs other than those described herein (e.g., more complex BRDFs having reflectance structures not capturable by the Blinn-Phong BRDF, or multi-lobe solutions) can be used. Further, faster encoding techniques for BRDF data can be implemented. Therefore, shading using texture space lighting and non-linearly optimized MIP-maps as described herein should not be limited to any single embodiment, but rather should be construed in breadth and scope in accordance with the appended claims.

What is claimed:

1. A processor-implemented graphics rendering method, the method comprising:
   determining, via the processor, in accordance with a variance of an x-component and a y-component of a normal vector of a highest resolution level MIP-map, reflectance parameters for all resolution levels of a MIP-map excluding the highest resolution level MIP-map, wherein for each resolution level of the MIP-map, excluding the highest resolution level MIP-map, the reflectance parameters are determined by calculating an error between using a current resolution level MIP-map and a higher resolution level MIP-map.

2. A method in accordance with claim 1, further comprising determining the reflectance parameters in accordance with eigenvalues of a covariance matrix, wherein the covariance matrix is determined in accordance with:

$$\frac{1}{k}\begin{bmatrix} \sum_{i=0}^{k}(N_x - \overline{N_x})^2 & \sum_{i=0}^{k}(N_x - \overline{N_x})(N_y - \overline{N_y}) \\ \sum_{i=0}^{k}(N_y - \overline{N_y})(N_x - \overline{N_x}) & \sum_{i=0}^{k}(N_y - \overline{N_y})^2 \end{bmatrix}; \text{ and}$$

N represents a normal vector of the texture space;
$N_x$ represents an x-component of N;
$N_y$ represents a y-component of N; and
k represents a region corresponding to the highest resolution level MIP-map.

3. A method in accordance with claim 2, further comprising:
   generating a table comprising:
      an average power of the covariance matrix;
      two eigenvalues of the covariance matrix; and
   selecting the reflectance parameters in accordance with entries from the table.

4. A tangible computer-readable storage medium, the tangible computer-readable storage medium having computer executable instructions stored thereon that, when executed, perform a method, the method comprising:

determining, in accordance with a variance of an x-component and a y-component of a normal vector of a highest resolution level MIP-map, reflectance parameters for all resolution levels of a MIP-map excluding the highest resolution level MIP-map, wherein for each resolution level of the MIP-map, excluding the highest resolution level MIP-map, the reflectance parameters are determined by calculating an error between using a current resolution level MIP-map and a higher resolution level MIP-map.

5. The tangible computer-readable storage medium of claim 4, further comprising determining the reflectance parameters in accordance with eigenvalues of a covariance matrix, wherein the covariance matrix is determined in accordance with:

$$\frac{1}{k}\begin{bmatrix} \sum_{i=0}^{k}(N_x - \overline{N_x})^2 & \sum_{i=0}^{k}(N_x - \overline{N_x})(N_y - \overline{N_y}) \\ \sum_{i=0}^{k}(N_y - \overline{N_y})(N_x - \overline{N_x}) & \sum_{i=0}^{k}(N_y - \overline{N_y})^2 \end{bmatrix} ; \text{ and}$$

N represents a normal vector of the texture space;
$N_x$ represents an x-component of N;
$N_y$ represents a y-component of N; and
k represents a region corresponding to the highest resolution level MIP-map.

6. The tangible computer-readable storage medium of claim 5, further comprising:
generating a table comprising:
an average power of the covariance matrix;
two eigenvalues of the covariance matrix; and
selecting the reflectance parameters in accordance with entries from the table.

7. A processor configured to perform the following:
determine, in accordance with a variance of an x-component and a y-component of a normal vector of a highest resolution level MIP-map, reflectance parameters for all resolution levels of a MIP-map excluding the highest resolution level MIP-map, wherein for each resolution level of the MIP-map, excluding the highest resolution level MIP-map, the reflectance parameters are determined by calculating an error between using a current resolution level MIP-map and a higher resolution level MIP-map.

8. The processor of claim 7, further configured to determine the reflectance parameters in accordance with eigenvalues of a covariance matrix, wherein the covariance matrix is determined in accordance with:

$$\frac{1}{k}\begin{bmatrix} \sum_{i=0}^{k}(N_x - \overline{N_x})^2 & \sum_{i=0}^{k}(N_x - \overline{N_x})(N_y - \overline{N_y}) \\ \sum_{i=0}^{k}(N_y - \overline{N_y})(N_x - \overline{N_x}) & \sum_{i=0}^{k}(N_y - \overline{N_y})^2 \end{bmatrix} ; \text{ and}$$

N represents a normal vector of the texture space;
$N_x$ represents an x-component of N;
$N_y$ represents a y-component of N; and
k represents a region corresponding to the highest resolution level MIP-map.

9. The processor of claim 8, further configured to perform the following:
generate a table comprising:
an average power of the covariance matrix;
two eigenvalues of the covariance matrix; and
select the reflectance parameters in accordance with entries from the table.

* * * * *